United States Patent

[11] 3,634,087

[72] Inventors James F. Houle;
Gilden R. Van Norman, both of Rochester, N.Y.
[21] Appl. No. 831,238
[22] Filed June 6, 1969
[45] Patented Jan. 11, 1972
[73] Assignee Eastman Kodak Company
Rochester, N.Y.
Original application Oct. 24, 1965, Ser. No. 505,041, now Patent No. 3,486,450, dated Dec. 30, 1969. Divided and this application June 6, 1969, Ser. No. 831,238

[54] COLOR PROOFING SYSTEM
5 Claims, No Drawings

[52] U.S. Cl. .... 96/49, 96/14, 96/30
[51] Int. Cl. .... G03c 1/56, G03c 1/78
[50] Field of Search .... 96/23, 35, 12, 11, 14, 49, 30

[56] References Cited
UNITED STATES PATENTS
3,258,337 6/1966 Cousins .... 96/35

*Primary Examiner*—Norman G. Torchin
*Assistant Examiner*—Alfonso T. Suro Pico
*Attorneys*—Walter O. Hodsdon and Dwight J. Holter

ABSTRACT: Lithographic color proofing is accomplished with transparent supports having hydrophilic surfaces and oleophilic images on said surfaces. The images are colored by an image lacquer which contains a greasy printing ink as an integral part of the lacquer.

COLOR PROOFING SYSTEM

This application is a divisional of U.S. Pat. application Ser. No. 505,041, filed Oct. 24, 1965now U.S. Pat. No. 3,486,450.

This invention concerns a color proofing system and the method of employing the color proofing system.

In the lithographic production of colored prints, it is necessary to prepare four separate printing plates, each of which prints a separate color in superposition to provide the desired print. The plates are made from separation negatives which are prepared from a colored transparency through filtering equipment. However, in order to determine whether the resulting print will be satisfactory, it has been necessary to actually make up the plates and run proofs. In the event that these proofs are unsatisfactory, the plates must then be changed and the procedure repeated. This involves considerable time and expense and it has been desired to provide a method of providing color proofs which would be accurate and providing a true reproduction of the prints which can be expected to be obtained from the actual use of the lithographic plates.

One method of color proofing has been suggested in which a diazoresin is coated on a transparent support for this purpose comprising diazoresins which contain color pigments so that the resulting image can be obtained in a desired color. However, this system requires a relatively large number of colors to be available in the color-containing diazocoating and further requires that the printer match his ink to the colors which are provided in the colored diazoresin. Accordingly, it has been desirable to avoid the difficulties inherent in the prior art systems requiring proofing from the actual plates or requiring a large number of colored diazocoated proofing materials, etc. It has also been desirable to provide a color proofing system which would be relatively inexpensive yet which would provide a true proofing element which would be keyed to the inks available to the printer and actually employ these inks to provide the colored images.

We have found a method of providing a color proofing system which employs a light-sensitive coating on a transparent dimensionally stable base which can be exposed through the same negative materials as are used for making the lithographic plate, and then processed to color proofs having the same colors as those obtained by the inks in the final printed colored reproduction.

One object of this invention is to provide a dimensionally stable color proofing element which is less expensive and truer to the inks employed in lithography than the prior art elements. Another object is to provide color proofing elements which can be exposed simultaneously and for the same length of time to the negatives used for preparing the diazolithographic color plates. A further object is to provide a color proofing method which enables the customers to visualize what the finished product will look like and which can be used to choose a satisfactory paper support by viewing the colored image on various paper backgrounds. An additional object is to provide a color proofing method which can be used for all types of color reproductions and which saves costly press time.

In one embodiment of our invention, a transparent support such as polyethylene terephthalate is treated with a composition made by effecting the hydrolysis of a titanium ortho ester in dilute hydrogen peroxide solution at room temperature. Any of the available titanium ortho esters may be used. Tetra isopropyl ortho titanate is a particularly useful ester in that the hydrolysis byproduct, isopropyl alcohol, does not require the use of elevated temperatures in drying.

The minimum peroxide concentration depends upon the titanium concentration. A minimum mole ratio of 2.88 moles of peroxide per mole of titanium ester is required for solubility, but an excess above that required for solubility may be used.

Particularly useful concentration ranges of the titanium ortho ester are 0.001 to approximately 0.08 moles per liter, while the peroxide content can be 0.003 to approximately 2.4 moles per liter.

Other aqueous solutions of an alkyl titanate are prepared with at least one solubilizing compound, such as fluosilicic acid, hydrofluoric acid, fluoboric acid, a mixture of hydrogen peroxide and phosphoric acid, etc. After the support has been treated with the hydrophilic coating, it is coated with a light-sensitive diazoresin, such as one formed by condensing formaldehyde with a p-diazodiphenylamine sulfate-zinc chloride double salt. Four elements are prepared and each is exposed to a negative which has been prepared through the corresponding filter for making the colored lithographic printing plates. After exposure, each of the four elements is processed by removing the unexposed areas and the image, then lacquered using a lacquer which employs the respective color-printing ink as the coloring agent to prepare each of the four printing elements.

The resulting four elements are superimposed so that the resulting composite presents a color proof which is essentially the same as that prepared from printing with the four color printing plates prepared employing the same diazoresin and the same printing inks on the press.

The transparent supports which can be used should preferably be those which are dimensionally stable and which resist stretching, shrinking, curling or yellowing. A particularly useful transparent support is made from a polyester such as, for example, polyethylene terephthalate. Other transparent supports which can be used include polystyrene, cellulose esters, polyolefins, polycarbonates, polyamides, etc.

The lacquers which can be used for imbibing into the image areas formed from the diazoresin may be any of those commercially available for this purpose to which has been added the printing ink as a colorant instead of using the coloring normally supplied in the lacquer. These lacquers are usually two-phase systems comprising an aqueous phase containing a water-soluble thickener or gum, such as gum arabic, carboxymethyl cellulose, etc., and a solvent phase comprising a vinyl polymer or similar oleophilic polymer and an organic solvent for the polymer which is water immiscible. The colorant for the lacquer, since it must be imbibed into the oleophilic image areas of the diazoresin, is incorporated in the solvent phase of the lacquer. A particularly useful lacquer is one prepared employing an aqueous phase having as the water-soluble thickener, a copolymer of an alkyl vinyl ether and maleic anhydride. Those products sold under the trade name of Gantrez AN are particularly useful. In the solvent phase, the oleophilic polymer is a vinyl chloride-acrylonitrile copolymer in a ratio of about 75:25 and having an inherent viscosity of about 0.15 in dimethyl formamide. Copolymers of ethylene-maleic anhydride as well as polysaccharides such as Kelzan are useful in the aqueous phase.

Suitable surfactants or emulsifiers for the aqueous phase include the large class of anionic surfactants comprising the alkyl sulfates and sulfonates, alkyl-aryl sulfonates, such as the Duponols and Alkanols. Nonionic surfactants derived from alkyl phenol-ethylene oxide adducts are also useful such as the Igepals, Makons, Tergitols, and Dowfax. Nonionic surfactants derived from ethylene oxide adducts of propylene oxide-propylene glycol block polymers such as the Pluronics are useful. Ethylene oxide adducts of sorbitan palmitate, laurate, oleate, and stearates are also useful. This class of surfactants is marketed under the Tween trade name. Cationic surfactants such as Alkaterage C., a substituted oxazoline, are useful.

Solvent soluble surfactants found most useful for the organic phase are the Spans, sorbitan esters of lauric, palmitic, stearic and oleic acids; and the Igepons, particularly Igepon AC–78, the coconut oil ester of sodium isethionate.

One class of binders suitable for use include polyvinyl acetate, copolymers of vinyl acetate-vinyl stearate, vinyl acetate-vinyl chloride, and vinylidene chloride-acrylonitrile. This class of polymers is soluble in ketones such as methyl isoamyl ketone, ethyl butyl ketone, methyl isobutyl ketone, diisobutyl ketone and cyclohexanone. All of these ketones are substantially immiscible with water and comprise the solvent in the organic phase.

Binders soluble in hydrocarbon solvents are also useful. Some examples are coumarone-indene resin (Cumar W½), styrenated alkyds (Paraplex), oil-modified alkyds (Rezyl, Duraplex), maleic ester-phenolic resins (Beckacites, Amberols), terpene and terpene-phenolic resins (Durez). Suitable solvents for these resins include benezene, toluene, xylene, naphtha, Stoddard solvent, butyl alcohol, isoamyl acetate, amyl alcohol, benzyl alcohol, cyclohexanol, butyl acetate, decalin, dipentene, methyl cellosolve and mesityl oxide.

Light-sensitive resins which may be used should preferably be the same resins as those which are employed on the lithographic printing plates which are to be used in making the colored prints. It is particularly advantageous when employing the color proofing elements of our invention to use the same diazo light-sensitive resin on the color proofing element as used on the printing plate. This method is especially useful for color proofing when the printing plate is prepared according to the process described in our U.S. Pat. No. 3,342,061.

The inks which may be used include those which are ordinarily used in printing color prints by lithographic process and are identified as greasy printing inks or as four-color process inks. However, any other inks may be used provided, of course, that they are those to be used to print the actual plate. These may be added to the colorless lacquer where they are dissolved or dispersed in the solvent phase and absorbed by the image area on the color proofing element.

It will be appreciated that our process can be used in various adaptations and that a wide degree of latitude is possible depending upon the intended purpose, the choice of the operators and the like. After the color proofs have been prepared, prior to lacquering, a degree of variation is possible in density depending upon he amount of ink which is incorporated in the lacquer. Based on the background and skill of the operator, it will be possible to vary the density of the color proofs to please those for whom the actual prints are to be prepared. The operator will then be able to regulate the presses to make the prints correspond to the color proofs which have been prepared to satisfy the purchaser of the four-color process prints. The leeway permitted by the operator in varying the density of color proofs is an advantage not found in those color proofing systems which contain a fixed amount of dye and cannot be varied in density. When these fixed-type color proofs are used, the press must be adjusted to fit a preconceived color proof which is prepared within a limited density range as compared to the much wider density range available through our invention with the advantages of matching actual press prints to the color proofs.

In the color proofing system described herein, it has been pointed out that the diazo-type light-sensitive resins are particularly advantageous for use in preparing the color prints. However, it will be appreciated that the other types of light-sensitive materials can be used including those described in our U.S. Pat. No. 3,342,061, incorporated herein by reference.

The following examples are intended to illustrate our invention but not to limit it in any way.

Example 1

To 1980 ml. distilled water is added 360 ml. of 30 percent hydrogen peroxide with mixing. When the mixture is homogenous, 30 ml. tetraisopropyl orthotitanate is added. Stirring is continued until solution is complete, requiring approximately one-half hour. A 2.5 ml. thick polyethylene terephthalate support is coated between rubber rolls, and dried under forced air at room temperature.

SENSITIZING THE SUBBED SUPPORT

Example 2

The subbed film base is coated with a 0.5 to 2.5 percent aqueous solution of a diazoresin, prepared as follows:

An 800ml. beaker is equipped with a mechanically driven propellor-type stirrer and external cooling is provided. To the reaction vessel is added 540 g. (5.35 moles) of 96 percent sulfuric acid followed by portion-wise addition of 138 g. (0.377 moles) of Sensitizer DP (para diazo diphenylamine sulfate, obtained from Fairmount Chemicals Co.) with stirring at 25° to 35° C. until solution is complete. The mixture is then cooled and maintained at 0° C. during the gradual addition of 100 ml. (0.592 moles) of 40 percent fluoboric acid followed by the addition of 13.0 g. (0.432 moles) paraformaldehyde with vigorous agitation to provide rapid and uniform dispersion of the paraformaldehyde. An additional 100 ml. (0.592 moles) 40 percent fluoboric acid is then added. The resultant mixture is now deep red in color whereas prior to the initial addition of fluoboric acid the solution was brownish in color. The reactant mixture is stirred and maintained at 0° C. for a period of 1 hour and 10 minutes whereupon it is poured with good agitation into 800 g. ice containing 210 ml. (1.24 moles) of 47percent fluoboric acid. The precipitate which forms is then filtered and collected. The moist cake is then dissolved in 700 ml. dimethylformamide and refiltered. The clear filtrate is then agitated during the addition of 220 g. (0.965 moles) of cadmium chloride ($CdCl_2 \cdot 2\ ½H_2O$ dissolved in 250 ml. water. The precipitate thus formed is filtered and collected. The moist cake is then added to 2 liters of isopropyl alcohol and stirred vigorously to produce a small uniform particle size which is filtered, collected and reslurried in the same manner as above in 1 liter of diethyl ether. The slurry is then filtered, collected and dried under vacuum at room temperature, care being taken to break up the moist cake to provide uniform drying. The yield of dry resin is 100 g. in the form of a light orange-yellow powder.

The coating is dried at room temperature.

The sensitized sheet is exposed through one of the same halftone separation negatives from which the printing plate is prepared. The unexposed areas are removed by a desensitizer containing a wetting agent, sodium sulfate, monosodium phosphate, sodium hydroxide, water and a copolymer of methyl vinyl ether and maleic anhydride.

The desensitized sheet is then developed to the process color corresponding go the separation negative through which the sheet was exposed.

DEVELOPING LACQUER

Solution 1. An aqueous phase is prepared consisting of the following:

| | |
|---|---|
| Water | 66 g. |
| Sodium lauryl sulfate | 1.5 g. |
| 3 percent copolymer of maleic anhydride and vinyl methyl ether solution in $H_2O$ | 50 g. |

Solution 2. A solvent phase is made consisting of the following:

| | |
|---|---|
| Vinylidene chloride-acrylonitrile copolymer I.V.=0.14 to 0.18 in N,N-dimethyl formamide | 12 g. |
| Sorbitan monopalmitate | 0.5 g. |
| Methyl isoamyl ketone | 50 g. |
| Ink* | 10 g. |

*Pope and Gray, Print Gloss Offset Metric Balance Process Ink.

An emulsion is prepared by adding solution 2 to a vigorously stirring solution 1. It is by this method that the best dispersion of the colorant is obtained. Optionally, the lacquer emulsion is prepared without any added colorant and the process ink added to the colorless emulsion. Shaking or stirring is sufficient to produce a usable color proofing lacquer.

Each of the four color proofs exposed through one of the respective color filters is colored the corresponding color using a lacquer containing the corresponding ink as the colorant. This results in four colored proofs which when superimposed on each other provide a four-color proof having the same colors as the inks used for printing from the plates made from the same separation negatives.

In a manner similar to example 2, the following lacquer formulations are used for the preparation of color proofs.

Example 3

To 153.7 g. stirred aqueous phase containing 21 percent of a 3 percent polysaccharide gum solution, 1 percent sodium lauryl sulfate and 78 percent water is added on organic phase containing:

6 g. copolymer of 87 percent of vinyl chloride & 13 percent vinyl acetate, I.V.=0.24 in cyclohexanone
0.3 g. coconut oil acid ester of sodium isethionate
40 g. Ethyl butyl ketone
8 g. Litho Color Process Ink After addition, stirring is continued for approximately 5 minutes after which the resultant emulsion is ready for us.

Example 4

To 153.7 g. of aqueous solution in example 3 is added an organic phase comprising:

3.0 g. Terpene phenolic resin
3.0 g. copolymer 87 percent vinyl chloride and 13 vinyl acetate, I.V.=0.24 in cyclohexanone
0.3 g. coconut oil acid ester of sodium isethionate
20 g. Toluene
20 g. Ethyl butyl ketone
8 g. Litho Color Process Ink After addition, stirring is continued for approximately 5 minutes, after which the resultant emulsion is ready for use.

It will be understood that various other methods of treating the support can be used provided the support is rendered hydrophilic with respect to the image area. Among the well-known methods of treating supports is included the treatment with silica to render the support hydrophilic. One particularly useful method embodies the use of colloidal silica sold under the trade name Ludox by Dupont. On the treated support can then be coated a light-sensitive material such as a diazoresin or the like.

It will also be appreciated that those customary steps involved in making a set of color separation negatives are well-known in the art and involved such know adaptations such as using color-correction masking film, screening, making hard dot halftone negatives, etc.

The inks, that are referred to herein, include those used in any printing system wherein this invention may be used. The inks may be pigment dispersions in a binder solution and the coloring matter may be a dye or lake.

The invention has been described in considerable detail with particular reference to certain preferred embodiments thereof, but it will be understood that variations and modifications can be effected within the spirit and scope of the invention as described hereinabove, and as defined in the appended claims.

We claim:

1. A process for preparing an element useful in the preparation of color proofs for a color lithographic printing system which comprises exposing to a color separation image of the printing system a color proofing element comprising a transparent support having on one side a hydrophilic surface and a light-sensitive coating on said hydrophilic surface, thereby forming a greasy printing ink-receptive image on said surface only in the region of exposure, removing the unexposed portion of said coating from the hydrophilic surface and imbibing into the ink-receptive image from a two-phase lacquer composition containing an aqueous phase and a resinous solvent phase, the same greasy printing ink as is to be used in the printing system to record said color separation image.

2. The invention according to claim 1 wherein the light-sensitive coating and ink-receptive image comprise a diazoresin.

3. A color proofing process wherein a plurality of elements prepared according to the process of claim 1 by exposure to different color separation images of the subject are superposed in register for viewing.

4. A process according to claim 3 for preparing an element useful in the preparation of color proofs for a color lithographic printing system which comprises exposing to a color separation image of the printing system a color proofing element comprising a transparent support having on one side a hydrophilic surface including a complex of an alkyl titanate and at least one member of the class consisting of fluosilicic acid, hydrofluoric acid, fluoboric acid, hydrogen peroxide and a mixture of hydrogen peroxide and phosphoric acid, and a light-sensitive diazoresin coating on said hydrophilic surface, thereby forming a greasy printing ink-receptive diazoresin image in the region of exposure, developing the exposed resin coating to remove the unexposed diazoresin from the hydrophilic surface, and imbibing into the resin image from a two-phase lacquer composition containing an aqueous phase and a resinous solvent phase the same greasy printing ink to be used in the printing system to record said color separation image.

5. A color proofing process wherein a plurality of color proofs prepared according to the process of claim 4 by exposure to different color separation images of the subject are superposed in register for viewing and prediction of the quality of a press proof obtainable from the color separation images.

* * * * *